United States Patent

Hoffmann et al.

[15] 3,641,743
[45] Feb. 15, 1972

[54] TORNADO-FLOW APPARATUS FOR SEPARATING PARTICULATE SUBSTANCE FROM GASES, PARTICULARLY ADHESIVE LIQUIDS FROM GASES

[72] Inventors: Alfred Hoffmann, Forchheim; Heinrich Klein, Erlangen, both of Germany

[73] Assignee: Siemens Aktiengesellschaft, Berlin, Germany

[22] Filed: Mar. 11, 1969

[21] Appl. No.: 806,187

[30] Foreign Application Priority Data

Mar. 13, 1968 Germany....................P 17 19 526.5

[52] U.S. Cl..................................55/236, 55/238, 55/242, 55/457, 55/459, 261/79 A
[51] Int. Cl......................................................B01d 47/06
[58] Field of Search............................55/235–238, 456–459, 55/242; 261/79 A

[56] References Cited

UNITED STATES PATENTS

| | | |
|---|---|---|
| 847,552 | 3/1907 | Carlson....................................261/79.1 |
| 2,664,966 | 1/1954 | Moore........................................55/236 |
| 3,177,634 | 4/1965 | Latham, Jr. et al........................55/236 |
| 3,199,270 | 8/1965 | Oehlrich....................................55/261 |
| 3,332,401 | 7/1967 | Lustenader..............................261/79.1 |
| 3,347,372 | 10/1967 | Bouchillon...............................209/211 |
| 3,379,011 | 4/1968 | Ohain et al.................................55/235 |

*Primary Examiner*—Frank W. Lutter
*Assistant Examiner*—Bernard Nozick
*Attorney*—Curt M. Avery, Arthur E. Wilfond, Herbert L. Lerner and Daniel J. Tick

[57] ABSTRACT

A tornado-flow apparatus for separating particulate substances, especially adhesive liquids, from gases, comprises a cylindrical separator vessel with an axial clean-gas outlet, a gas inlet duct coaxially opposite the outlet and tangential gas inlets obliquely opposed to the flow direction of the inlet duct for producing in the vessel a tornado flow which causes the particulate substance to be separated from the gas and carried outwardly into an annular interspace surrounding the axial inlet duct. Nozzle devices are provided for producing a veil of liquid in the tornado chamber or on the inner wall surface of the chamber. Preferably the nozzle devices comprise a spray nozzle coaxially mounted in the mouth of the inlet duct so as to produce a conical veil of liquid in the lower region of the vessel; and tangential nozzle means in the upper region of the vessel inject liquid to wet the inner wall of the vessel.

3 Claims, 1 Drawing Figure

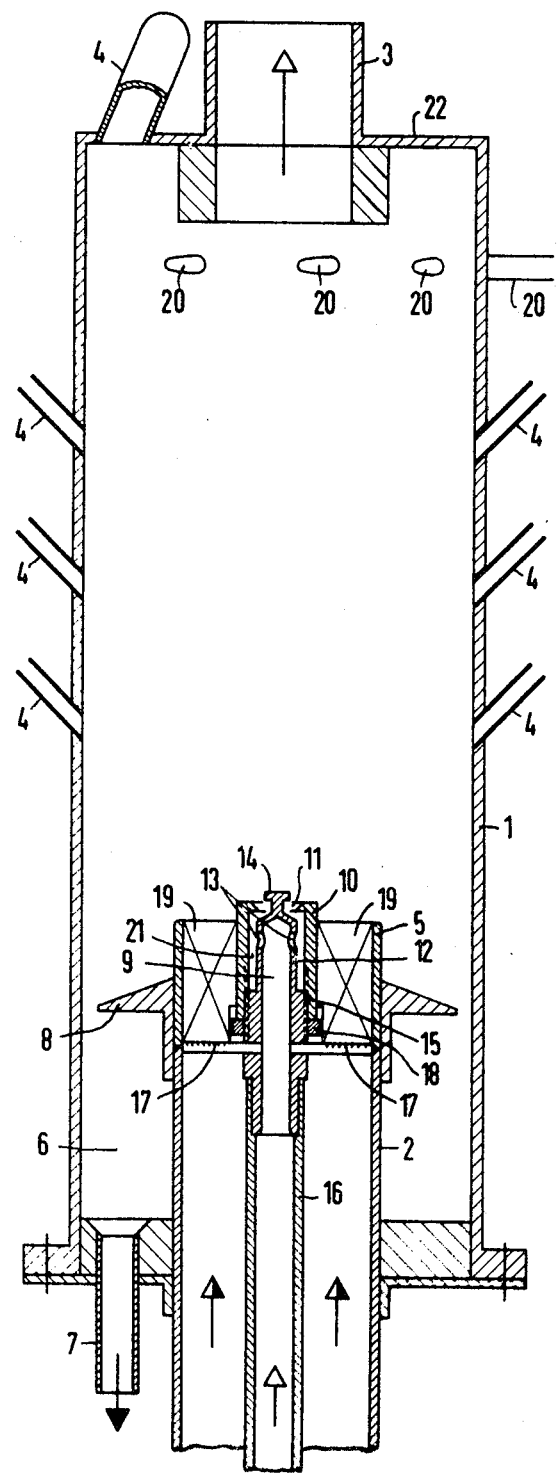

TORNADO-FLOW APPARATUS FOR SEPARATING PARTICULATE SUBSTANCE FROM GASES, PARTICULARLY ADHESIVE LIQUIDS FROM GASES

Our invention relates to tornado-flow apparatus for separating particulate matter from gases in which such matter is entrained. In a more particular, though exclusive aspect the invention concerns tornado-flow apparatus for separating adhesive liquids, such as paint sprays or other easily adhering substances from gases.

Tornado-flow apparatus of the kind here involved comprise a cylindrical vessel which forms a processing or tornado chamber proper and is provided with a clean-gas-outlet duct in coaxial relation to the vessel. A gas inlet duct axially opposite the outlet duct may supply the gas with the entrained matter to be separated. The vessel is further equipped with additional gas inlets which are inclined toward the gas inlet duct and generally extend tangentially to the processing chamber of the vessel. The gas supplied through the tangential and inclined inlets may also consist of a particle-laden flow of gas. It is irrelevant whether all or most of the particle-laden gas is supplied through the axially located inlet duct while an auxiliary gas flow is supplied through the tangentially inclined inlets or whether, conversely, most or all of the flow of particle-laden gas enters through the tangential and inclined inlets while a supply of clean gas or a smaller amount of particle-laden gas passes through the axially located inlet duct. As a result of the axial flow through the inlet duct and the tangential flow through the inclined inlets, there occurs in the vessel a so-called tornado flow which is composed of an outer helical potential flow in the vicinity of the vessel walls and an inner helical rotational flow which rotates in the same sense as the outer flow but advances in the axially opposite direction, the inner flow being comparable to the hose of a natural tornado. The particulate matter to be separated is carried in the direction toward the inner peripheral surface of the processing vessel without normally reaching it and then passes downwardly in a region between the outer helical flow and the inner helical flow until it reaches a collecting gap space of annular shape which surrounds the axially located gas inlet duct within the vessel. As to the physical phenomena involved in the separating performance by tornado flow and also with respect to the terminology herein applied, reference may be had to the more detailed explanations presented in U.S. Pat. No. 3,199,268 and No. 3,199,272, for example.

It is an object of my invention to improve the efficacy and efficiency of such tornado-flow separators with respect to the separation of solid particles such as may occur as fly ash in the operation of incinerators.

Another object of my invention is to render tornado-flow apparatus suitable for a separation of adhesive liquids, for example paint spray or other liquid particulate matter as occur in spray mists, from the entraining gas.

When adhesive liquids, for example paint sprays, oils or other surface-protecting media, are to be separated from a gaseous carrier in a tornado-flow separator of the above-mentioned kind, there is the danger of some of the liquid being thrown onto the inner wall surface of the processing vessel and adhering to that surface. The resulting accumulation may cause clogging of the processing chamber. It is therefore among the more specific objects of my invention to more reliably prevent deposition of adhesive substance, particularly adhesive liquids, on the inner wall surface of the processing chamber or on other parts thereof.

To achieve the above-mentioned objects, and in accordance with a feature of my invention, I provide the tornado-flow separator vessel with liquid-supply means, and connect to the liquid-supply means a nozzle device whose orifice means are open toward the interior of the vessel and directed toward the inner wall surface of the vessel for maintaining a veil of liquid. According to another feature of the invention, I arrange a spray nozzle coaxially in the mouth of the axial gas inlet pipe to produce a cone-shaped veil of liquid in the lower region of the tornado chamber. According to still another feature of the invention, I provide additional tangential nozzles in the upper region of the tornado chamber for supplying a liquid which causes wetting of the inner wall surface of the processing vessel. Preferably, a tornado-flow separator according to the invention is equipped with a spray-cone nozzle in the gas inlet tube at the bottom of the cylindrical tornado vessel and also with tangential liquid nozzles in the top portion of the vessel.

If the separator is to be used for the separation of solid particles from gas, the wetting effected by the spray nozzle or the tangential nozzles mentioned above, may be effected by using water. However, if the matter to be separated from the gas is paint or another aerosol constituent insoluble in water, the gas supplied by either the spray nozzle or the lateral inlet may consist of a proper solvent for the material to be prevented from adhering to the inner wall surface of the vessel.

The particles to be separated out are seized and to a large extent agglomerated by the liquid veil produced by the nozzle in the gas inlet tube. The veil thus contributes to more reliably separating the particles without having the possibility of coming into contact with the wall of the tornado chamber. The spray nozzle preferably has an outer casing in the form of a cylindrical tube with a conically expanding aperture at the top and, coaxial therewith, a liquid-supply duct closed at the top and sealed to the bottom of the outer casing of the valve. The duct has radial bores in its upper region and carries a valve-plate-shaped extension in or above the conically expanding aperture of the valve outer casing. Preferably, the outer casing of the valve is made axially displaceable in relation to the liquid-supply duct, for the purpose of adjusting the nozzle aperture and regulating the veil of liquid.

For improved stimulation of the tornado flow, it is of advantage to provide guide vanes in the mouth region of the axial gas inlet, between the outer casing of the spray nozzle and the inner casing of the gas inlet duct, since these impart an initial twist to the gas-particle mixture. In order to prevent adhesive liquid from being deposited on the guide vanes, the lower edges thereof may be provided in the region of flow with a supply of liquid extending over their entire width, so that the guide vanes are also wetted with a veil of liquid.

The construction of operation of the invention will be explained in greater detail with reference to an embodiment shown by way of example on the accompanying schematic drawing.

A gas-liquid mixture to be cleaned enters the tornado chamber in a cylindrical vessel 1 axially from below through an inlet duct 2. Arranged on the vessel 1 and/or in a cover 22 thereof, above the mouth 5 of inlet duct 2, there are obliquely tangential nozzles 4 for producing an outer potential flow running helically downward in the region close to the inner wall surface of the vessel. One portion of the potential flow passes over the mouth 5 of the gas inlet duct 2 (through a vortex sink) to the axis of the tornado chamber, where it rises with the inflowing gas-liquid mixture in the form of a rotating flow to a clean-gas outlet 3. Above the mouth 5, the particles to be separated out are discharged (in a vortex source) toward the wall of the vessel 1 and are carried into an annular interstitial space 6 between the gas inlet duct 2 and the inner wall of the vessel 1. From space 6 the collected particles are drained through an outlet 7 opening into a bunker, not shown. The outlet 7 may be arranged either vertically downward as shown or obliquely toward one side in a separate bunker. A diaphragm 8 is attached to gas inlet duct 2 in the annular space 6 in order to form a narrow annular gap between duct 2 and vessel 1 to thereby improve the separating process.

According to the invention, a spray nozzle 9 is arranged coaxially within the mouth area 5 of inlet duct 2. The nozzle produces an approximately conical and upwardly widening veil of liquid in the lower part of the tornado chamber in vessel 1. A large part of the liquid particles to be separated out are seized by this veil of liquid and are carried to the wall of the vessel 1. While the veil of liquid also impinges upon the middle or upper portion of the vessel wall and thus produces a film of liquid running down the chamber wall, this film consists of a mixture of the liquid and the adhesive liquid or other particles to be separated out. This contributes to preventing adhesion, but the occurrence of deposits on the inner wall of the chamber may not always be prevented entirely. For this reason, additional tangential nozzles 20, which may also be directed obliquely downward, are arranged in the top portion of the tornado chamber, in order to supply an additional flow of liquid. The entire inner casing of the vortex chamber is thereby wetted with a veil of liquid, thus fully obviating any adhesion of particles to be separated and consequent blocking of the separator chamber.

The spray nozzle 9 has an outer casing 10 in the form of a cylindrical tube with a conically expanding orifice 11 at the top, from which the liquid is sprayed into the tornado chamber. A liquid-supply duct 12, closed at the top, is arranged coaxially within the casing 10 in such a manner that an annular space 21 is left free between the valve outer casing 10 and the liquid-supply duct 12, this space being sealed in the bottom portion of the outer casing 10 by means of an internally threaded sealing ring 18 tightly screwed against the lower end of valve casing 10. The top of duct 12 carries a plate-shaped extension 14 at the conical orifice 11 in valve casing 10.

The liquid flowing through a supply pipe 16, coaxial with inlet duct 2, into the duct 12 passes through radial bores 13 in the upper area of the duct 12, thence into the annular space 21 and through the orifice 11 into the tornado chamber. For the purpose of adjusting the nozzle opening, the valve outer casing 10 is axially displaceable relative to the liquid-supply duct 12. To this end, the valve casing 10 is connected to the duct 12 by a screw thread 15 so that the valve casing may be adjusted at will.

For improved stimulation of the rotation of the gas-liquid mixture to be cleaned, guide vanes 19 are arranged in mouth area 5 of the inlet duct pipe 2 between the spray nozzle 9 and the inner surface of the inlet duct; the vanes 19 are shaped for imparting a twist to the incoming flow, thus contributing to the stimulation of the rotational flow.

To prevent the liquid particles from settling on the guide vanes 19 of the pretwisting nozzle, the outer casing 10 of the nozzle has radial bores in the region where the flow impinges upon the guide vanes, and a portion of the auxiliary liquid is sprayed onto the guide vanes through lateral bores of an additional liquid-supply pipe 17 extending over the entire width of the guide vanes. Thus, the guide vanes are wetted with a veil of liquid. It is also possible to make the vanes 19 themselves hollow in their lower regions, allowing the liquid to escape from holes therein.

The invention is not restricted to separating out adhesive liquid particles. It is also possible to separate mixtures of liquids of different densities, e.g., water-oil mixtures, in a tornado flow separator of this kind. Moreover, by utilizing the radial pressure drop in apparatus of this kind, liquids which are easy to vaporize may be separated from liquids which are hard to vaporize. As mentioned, apparatus according to the invention is also applicable for separating out very fine dust or other solid particles that need not issue from the separator in dry condition. Aside from industrial purposes, the versatility as to the use of such apparatus makes them also advantageous for air pollution control.

Upon a study of this disclosure, it will be obvious to those skilled in the art that my invention permits of various modifications and may be given embodiments other than illustrated and described herein, without departing from the essential features of my invention and within the scope of the claims annexed hereto.

We claim:

1. Tornado-flow apparatus for separating adhesive liquids from gases, comprising a cylindrical separator vessel having an axial clean-gas outlet, a gas inlet duct coaxially opposite said outlet and forming an annular interspace between said duct and said vessel, said vessel having tangential gas inlets obliquely opposed to the flow direction of said inlet duct for producing in said vessel a rotating flow in the form of an outer helical potential flow and an inner helical rotating flow turning in the same direction as said outer flow and advancing in an opposed axial flow direction whereby particles of liquid are separated out of the gas and carried outwardly toward the inner wall surface of the vessel and into said interspace surrounding said axial intake duct, and outlet means adjacent said axial intake duct for discharging separated particles of liquid from said interspace, in combination with the improvement comprising a spray nozzle having an adjustable nozzle aperture for producing a conical veil of liquid in the lower region of said vessel directed toward said clean-gas outlet, said spray nozzle being mounted coaxially in the mouth of said axial inlet duct, means adjacent said spray nozzle for imparting a twist to the incoming flow of gas and liquid, and said vessel having additional tangential nozzle means for introduction of liquid to wet the inner wall of said vessel, said additional tangential nozzle means being provided in the upper region of the said vessel, said spray nozzle comprising an outer casing in the form of a vertically extending cylindrical tube having a wall at the top thereof formed with a conically expanding aperture, a vertically extending liquid-supply duct coaxially located in said casing and closed at the top thereof, said liquid-supply duct forming with said casing an annular interspace sealed at the bottom thereof, said supply duct having lateral bores in its upper region, and a plate-shaped extension mounted on top of said supply duct near said aperture.

2. In apparatus according to claim 1, said outer casing being axially displaceable in relation to said liquid-supply duct for adjusting said nozzle aperture.

3. Apparatus according to claim 1, comprising guide vanes for imparting an initial twist to the gas-liquid mixture, said vanes being situated in the mouth region of said axial inlet duct between said outer casing of said spray nozzle and the inner surface of said inlet duct and being provided at their lower edges with liquid supply means extending over the transverse width of said respective vanes for wetting the vane surfaces.

* * * * *